United States Patent
Stewart et al.

(10) Patent No.: US 6,894,439 B2
(45) Date of Patent: May 17, 2005

(54) PORTABLE POWER CONVERTER PACK

(75) Inventors: Ean Patrick Stewart, Toowoomba (AU); Andrew Douglas Burchill, Toowoomba (AU)

(73) Assignee: The Aussie Light Company Pty, Ltd., Queensland (AU)

( * ) Notice: Subject to any disclaimer, the term of this patent is extended or adjusted under 35 U.S.C. 154(b) by 0 days.

(21) Appl. No.: 10/275,448

(22) PCT Filed: May 4, 2001

(86) PCT No.: PCT/AU01/00512
§ 371 (c)(1),
(2), (4) Date: Jun. 23, 2003

(87) PCT Pub. No.: WO01/86790
PCT Pub. Date: Nov. 15, 2001

(65) Prior Publication Data
US 2004/0012268 A1 Jan. 22, 2004

(30) Foreign Application Priority Data
May 5, 2000 (AU) ............................................. PQ 7327

(51) Int. Cl.[7] ........................... H05B 41/32; H01J 25/34; H02M 1/00
(52) U.S. Cl. ................ 315/241 P; 315/240; 315/39.51; 315/94; 315/3.6; 307/150; 307/328; 307/326
(58) Field of Search ............................ 315/241 P, 240, 315/39.51, 94, 3.6, 5.35, 5.12, 291, 219, 307; 307/326, 328, 150, 2, 26; 363/146, 15, 16

(56) References Cited

U.S. PATENT DOCUMENTS

| | | | | |
|---|---|---|---|---|
| 4,027,273 A | * | 5/1977 | Yang | 372/36 |
| 4,369,395 A | * | 1/1983 | Stempeck | 315/241 P |
| 4,894,586 A | * | 1/1990 | Crager et al. | 315/39.51 |
| 5,355,300 A | * | 10/1994 | Zinn | 363/146 |
| 5,604,406 A | * | 2/1997 | Gaus | 315/56 |
| 5,734,229 A | | 3/1998 | Bavaro et al. | |
| 5,821,742 A | * | 10/1998 | Carr et al. | 324/74 |

FOREIGN PATENT DOCUMENTS

| | | |
|---|---|---|
| GB | 2 096 416 | 10/1982 |
| GB | 2 244 608 | 12/1991 |

OTHER PUBLICATIONS

Oatley Electronics advertisement, www.oatleyeletronics.com, Feb. 22, 2001.
Oatley Electronics advertisement, www.latleyelectronics.com, Feb. 22, 2001.

* cited by examiner

*Primary Examiner*—Don Wong
*Assistant Examiner*—Chuc Tran
(74) *Attorney, Agent, or Firm*—Knobbe Martens Olson & Bear LLP

(57) ABSTRACT

A portable power converter comprising input means to receive low voltage DC input, voltage converter means for converting the low voltage DC input into high DC voltage output, the voltage converter means in electrical communication with the input means, output means for operably supplying the high DC voltage to an appliance. The output means is in electrical communication with the converter includes a housing adapted to receive at least one of the input means, the voltage converter means and the output means. Preferably, the portable power converter also includes processing means for controlling some of the functions of the device such as shutting it down when power falls below preselected threshold. The device may also include a remote control which may be manually activated or in an alternative embodiment activated by external environment stimuli.

47 Claims, 10 Drawing Sheets

PORTABLE POWER CONVERTER PACK

FIELD OF THE INVENTION

The present invention relates generally to a portable power converter and various uses therefor including but not limited to operating electrical discharge lamps. The portable power converter of the present invention enables the provision of high DC voltage in a safe, efficient and efficacious manner. In a particularly preferred embodiment, the portable power converter of the present invention enables the operation of electrical discharge lamps from automobiles, boats and other sources which principally operate using voltage of less than 50 volts DC. The portable power converter of the present invention is readily transportable by hand and, especially in relation to the operation of electrical discharge lamps, is compact having all the required components in close proximity.

BACKGROUND OF THE INVENTION

A range of appliances has been developed to provide a power source at locations where it is either not practical and/or dangerous to be connected to mains power. One commonly used method involves the use of a fuel-driven generator. However, such generators are heavy, large, lack ready portability and are not practical for use in automobiles, caravans and boats. Generators also generally produce mains (AC) power which can be dangerous to users, especially in wet conditions.

An alternative and more compact form of power source is based on harnessing the sun's energy through solar panelling. However, these systems are expensive, weather dependent and may not necessarily produce sufficient current for particular needs. An innate problem with solar power systems arises from the fact that energy impact per unit of surface area is not sufficiently high to provide concentrated power generation.

Inverters are also available to invert low direct current ("DC") voltage such as around 8–12 volts to alternating current ("AC") mains power levels, i.e. around 220–240 volts. However, such inverters are expensive and readily deplete the DC voltage power supply. Furthermore, the mains power output is dangerous to potential users, especially in inclement weather.

There is a need, therefore, for a safe, inexpensive and convenient system for providing power to operate appliances and, in particular, lighting appliances. Such a system should be easily portable and may be independent of mains power supply.

SUMMARY OF THE INVENTION

In a first aspect, the invention resides in a portable power converter comprising input means to receive low voltage DC input, voltage converter means for converting said low voltage DC input into high DC voltage output, the voltage converter means in electrical communication with the input means, output means adapted to operably supply the high DC voltage to two or more appliances and in electrical communication with the converter means and a housing adapted to receive at least one of the input means, the voltage converter means and the output means.

The input means may be at least one input electrical conducting lead. The voltage converter means maybe a DC step-up transformer and the output means may include one output electrical conducting lead.

The low voltage DC power may be in the range of from about 5 volts to about 50 volts, preferably about 8 volts to about 24 volts. The high DC voltage may be in the range from about 200 volts to about 600 volts, preferably about 300 volts to about 400 volts and most preferably about 320 volts to about 380 volts.

The electrical output lead is preferably at least 100 meters long and maybe at least 200 meters or even at least 500 meters.

The housing may include a first internal compartment adapted to receive the voltage converter means and a second internal compartment adapted to store the input means and the output means when not in use. The second compartment may be further adapted to receive the two or more appliances when not in use.

The housing may be formed from two engageable components movable between a closed position and an open position The two components may be moulded and hingedly connected to allow rotation of the components relative to each other between the closed position and the open position.

The electrical output lead may comprise a plurality of interconnectable leads. Each lead may be about 10 meters in length.

The portable power converter preferably further comprises two or more appliances, at least one of which may be an electrical discharge lamp.

The electrical discharge lamp may be a compact fluorescent lamp and may be held by a ceramic and/or plastic fitting engageable with an end of the output lead remote from the power converter means or intermediate the end and the power converter means. Preferably, the compact fluorescent lamp is protected by a transparent shield.

The housing may further comprise attachment means for fixing the housing to a surface. The attachment means may be at least one aperture for receiving a fixing member.

Alternatively, the attachment means may comprise a clamp engageable with the housing, and including at least one aperture for receiving a fixing member.

The inlet socket means may be located between the input means and the converter means and outlet socket means located between the converter means and the output means for removably engaging the input means and output means respectively. The portable power converter may further comprise switch means for controlling the delivery of power to the output means, the switch means movable between a first position in which an electrical circuit for distribution of power to the output means is open and a second position wherein the electric circuit is closed. The switch means may be a toggle switch. The input socket means, the output socket means and the switch means can be located in an external recess of the housing. The external recess may include a protective barrier movable between a first position wherein access to the input socket means the output socket means and the switch means is provided and a second position wherein the recess is protected from an external environment. The housing is preferably waterproof.

In a further aspect, the invention resides in a portable power converter comprising a weather resistant housing, comprising a handle and two hingedly engaged members movable between a closed position and an open position, a power converter for converting low DC voltage to high DC voltage, the power converter located inside the housing, an input lead for providing an electrical connection between a power source and the power converter, an inlet socket for removably receiving an end of the input lead, the inlet socket in electrical connection with the power converter, one or more output leads for providing electrical connection between the power converter and two or more appliances, at least one outlet socket for removably receiving the or one of the output leads, a switch for the at least one outlet socket said switch movable between an off position in which an electrical circuit in a respective outlet lead is open and an on position in which the electric circuit is closed and two or more compact fluorescent lamps wherein the input lead, the at least one output lead and the two or more compact fluorescent lamps are stowable within the housing.

The one or more output leads may comprise multiple interconnectable extension leads.

The portable power converter may further comprise processing means wherein the processing means may be a microprocessor. The microprocessor maybe programmed to do any one or more of control high voltage switching, control electro-luminescent lamp activity, control voltage converter shut down, receive data input from remote devices, respond to input by a user through a keyboard, monitor boost circuit voltages, control power up and power down sequences and shut down the system at the boost circuit level.

The portable power converter may further include a power monitor engageable with the output terminals of a power source and in signal communication with the processing means.

The portable power converter may further include boost circuit means for boosting DC voltage prior to delivery to the converter means where the boost circuit means is in electrical communication with the converter means and the power source and located intermediate the converter means and the power source. The boost circuit means may be in signal communication with the microprocessor means and subject to control by the microprocessor means.

The boost circuit means may further included circuit switching means for opening or closing a circuit to the voltage converter means the circuit switch means moveable between an on and off position in response to signal communication from the microprocessor means.

The portable power converter may further including programming means. The programming means may be a keyboard in signal communication with the microprocessor. The keyboard may further include electro-luminescent backlighting.

The portable power converter may further include receiving means to receive a transmitted signal, the receiving means in signal communication with the processing means.

The portable power converter may further include a switch pack, the switch pack comprising a secondary control unit and a switch, the secondary control unit in signal communication with the processing means. The switch pack may further include keypad control means in signal communication with the secondary control unit and providing local control of the secondary control unit.

The portable power converter may further include a remote control device and the remote control may be manually activated. Alternatively or additionally, the remote control may be activated by sensors responsive to environmental stimuli such as one or more of sound, movement, light and temperature.

The portable power converter may further comprise a power source locatable within the weather resistant housing. The power source may be a battery.

In yet another aspect of the present invention, there is provided a portable power converter comprising means to receive low DC voltage input in electrical communication with voltage converter means which provides a source of high DC voltage and means for operably supplying said high DC voltage to an appliance.

Still a further aspect of the present invention contemplates a portable power converter comprising components locateable in one or more compartments on or within a housing, said components comprising means to receive low DC voltage input in electrical communication with voltage converter means which provides a source of high DC voltage and means for operably supplying said high DC voltage to an appliance.

Still another aspect of the present invention is directed to a portable power converter comprising components located in one or more compartments on or within a housing, said components comprising means to receive low DC voltage input in the range of from about 5 to about 50 volts DC in electrical communication with voltage converter means which provides a source of high DC voltage in the range of from about 280 to about 480 volts DC and means for operably supplying said high DC voltage to an appliance.

Yet another aspect of the present invention is directed to a portable power converter for operating an electrical discharge lamp, said portable power converter comprising means to receive low DC voltage input in electrical communication with voltage converter means which provides a source of high DC voltage sufficient to operate an electrical discharge lamp and means for operably supplying said high DC voltage to said electrical discharge lamp.

Even yet another aspect of the present invention contemplates a portable light source comprising means to receive low DC voltage input in electrical communication with voltage converter means which provides a source of high DC voltage sufficient to operate one or more electrical discharge lamps such as one or more composite fluorescent lamps and means for supplying said high DC voltage to said one or more electrical discharge lamps.

DETAILED DESCRIPTION OF THE PREFERRED EMBODIMENTS

Figure 1:
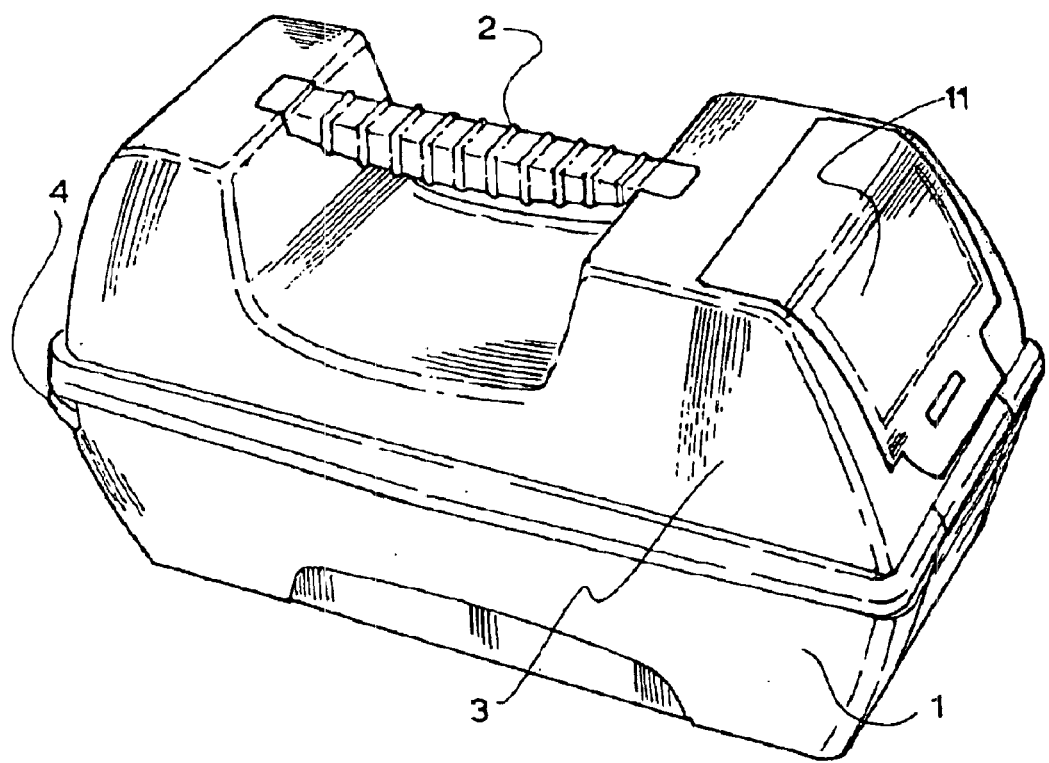
FIG. 1 is a side perspective view of the housing for the portable power converter.

The present invention is predicated in part on the determination by the inventors that a voltage converter is capable of generating sufficient voltage to run an electrical discharge lamp. The voltage converter generates high DC voltage from a low DC voltage power source. Although the present invention is particularly useful in operating electrical discharge lamps, the high DC voltage may also operate a range of other appliances including but not limited to insect attracting appliances, electric fences and the like.

Accordingly, one aspect of the present invention provides a portable power converter comprising means to receive low DC voltage input in electrical communication with voltage converter means which provides a source of high DC voltage and means for operably supplying said high DC voltage to an appliance.

Reference herein to the term "portable" includes reference to the components of the power converter being arranged in a housing or other container and which can be readily carried or transported by a person. The housing may be in compartmental form. In one embodiment, the housing is in multiple compartment form where two or more compartments may be integrally connected or produced separately and placed together in a demountable or detachable arrangement. Preferably, however, the components of the power converter are located within one or more compartments of a housing. In a preferred embodiment, two or more compartments are employed.

According to this embodiment, the present invention contemplates a portable power converter comprising components located in one or more compartments on or within a housing, said components comprising means to receive low DC voltage input in electrical communication with voltage converter means which provides a source of high DC voltage and means for operably supplying said high DC voltage to an appliance.

The components, if located on a housing, are conveniently attached via fastening means.

The voltage converter means preferably comprises a step-up transformer capable of amplifying low DC voltage to high DC voltage. The term "low voltage DC" generally encompasses voltages within the range from about 5 volts to about 50 volts DC and more preferably from about 6 volts to about 36 volts DC and even more preferably from about 8 volts to about 24 volts DC. Particularly preferred low voltages are about 8, 12, 24 or 36 volts with a variation of about 4 volts. "High voltage DC" encompasses voltages within the range from about 280 to about 480 volts DC, more preferably from about 300 to about 400 volts DC and even more preferably from about 320 to about 380 volts DC such as about 360 volts DC. The term "such as" encompasses a variation of from about 5–10 volts DC. A particular advantage of these voltage ranges arises from the discovery of the inventors that at these levels power may be supplied over long distances with a voltage drop with minimal adverse effect on the system. These distances may be over 100 meters, preferably over 200 meters and up to and beyond 500 meters. This provides a great advantage to a user of the invention in that he or she can effectively power an end appliance at a great distance from the power source and portable converter. This is a clear advantage in a situation where a light is energised by the system. The light may be moved widely and freely and is especially useful in the circumstances of searching for an object at night, inspecting a dark corridor such as a cave or tunnel or simply having multiple separated light sources.

Accordingly, another aspect of the present invention is directed to a portable power converter comprising components located in one or more compartments on or within a housing, said components comprising means to receive low DC voltage input in the range of from about 5 to about 50 volts DC in electrical communication with voltage converter means which provides a source of high DC voltage in the range of from about 280 to about 480 volts DC and means for operably supplying said high DC voltage to an appliance.

The term "electrical communication" includes direct electrical contact or via circuitry or via another suitable mechanism. The electrical communication may, therefore, be direct or indirect. The term "electrical communication" includes "electrical connection".

The means to receive low DC voltage input is conveniently an electrical lead providing a source of low DC voltage by connecting a low DC voltage source to the voltage converter. The lead may be in direct electrical connection with the voltage converter circuitry or it may be indirect via a suitable mechanism or via an electrical plug or socket. Similarly, the means for operably supplying the high DC voltage to an appliance may be by an electrical lead directly from the voltage converter to the appliance or via a switch mechanism or an electrical plug or socket.

The housing, and preferably the compartmentalized housing, is conveniently capable of receiving and/or storing all the electrical leads from a low DC voltage supply as well as supplying the high DC voltage to an appliance. Most preferably, the appliance is also stowable on or within the housing.

As stated above, the appliance may be any appliance capable of operating under high DC voltage. The term "appliance" includes one item or multiple items. If multiple items are employed, they may be all the same or different appliances. Examples include electrical discharge lamps, insect attracting lamps, electric fences and the like. Another example of a suitable appliance is in dichroics. The most useful appliance in accordance with the present invention is an electrical discharge lamp.

Accordingly, another aspect of the present invention is directed to a portable power converter for operating an electrical discharge lamp, said portable power converter comprising means to receive low DC voltage input in electrical communication with voltage converter means which provides a source of high DC voltage sufficient to operate an electrical discharge lamp and means for operably supplying said high DC voltage to said electrical discharge lamp.

Preferably, the portable power converter comprises components located or locateable in one or more compartments on or within a housing. Preferably, the electrical discharge lamp is also receivable and/or storable on or within same housing.

The term "electrical discharge lamp" is used in its broadest sense and includes any lamp or group of lamps which emit light from a substance, including a gas, bombarded by particles (e.g. electrons or radiation). Examples of suitable substances including gases are argon, mercury, halogen, neon, xenon and krypton. In a most preferred embodiment, the electrical discharge lamp is a compact fluorescent lamp. Such a lamp produces light by the fluorescence of a phosphor coating. A composite or compact fluorescent lamp generally comprises a mixture of argon and mercury in a sealed tube. Metal electrodes at each end of the tube are coated with an alkaline earth oxide that readily releases electrons. When current flows through the ionized gas between the electrodes, it emits ultraviolet radiation. The inside of the tube is coated with phosphors, substances which absorb ultraviolet radiation and fluoresce, i.e. irradiate the energy as visible light. Any phosphor material may be employed such as zinc silicate and magnesium tungstate. The term includes compact fluorescent lights (CFL).

The portable power converter may be used to operate a single electrical discharge lamp or multiple electrical discharge lamps such as from about 2 to about 20, more preferably from about 2 to about 15 and even more preferably from about 2 to about 8.

In a particularly preferred embodiment, the portable power converter is in the form of a portable light source.

Accordingly, a particularly preferred embodiment of the present invention contemplates a portable light source comprising means to receive low DC voltage input in electrical communication with voltage converter means which provides a source of high DC voltage sufficient to operate one or more electrical discharge lamps such as one or more composite fluorescent lamps and means for supplying said high DC voltage to said one or more electrical discharge lamps.

The present invention is further directed to the use of a voltage converter means which provides a source of a high DC voltage sufficient to operate one or more electrical discharge lamps in the manufacture of a portable light source.

Although the present invention is particularly useful in the form of a portable light source, the components of the light source may also be mounted separately such as in an automobile or boat. Generally, such a mounting would be permanent or otherwise not designed for ready detachment.

In one embodiment the housing may include attachment means for fixing the housing to a surface. The attachment means may be in the form of an aperture for receiving a fixing means such as a screw or stud. The screw may be inserted through the aperture and fixed to the wall of a boat, caravan or in any suitable location. Alternatively a stud may be fixed to the surface, located through the aperture with a nut and washer retention fixture applied. Clearly it is preferable to have at least two such apertures to provide additional support and rotational stability to the housing. The apertures may be formed in external lugs moulded integrally with the housing members.

The portable power source of the present invention may be used in a variety of useful applications such as in camping, in road or boating safety, for a variety of work conducted at night and in the powering of multiple lights using DC voltage. The unit is portable, lightweight and all the components can be located in close proximity such as on or in the housing.

The present invention is now described with reference to the following preferred Example. This is done, however, with the understanding that the present invention encompasses all variations to the power converter and its various uses.

EXAMPLE

Figure 2:
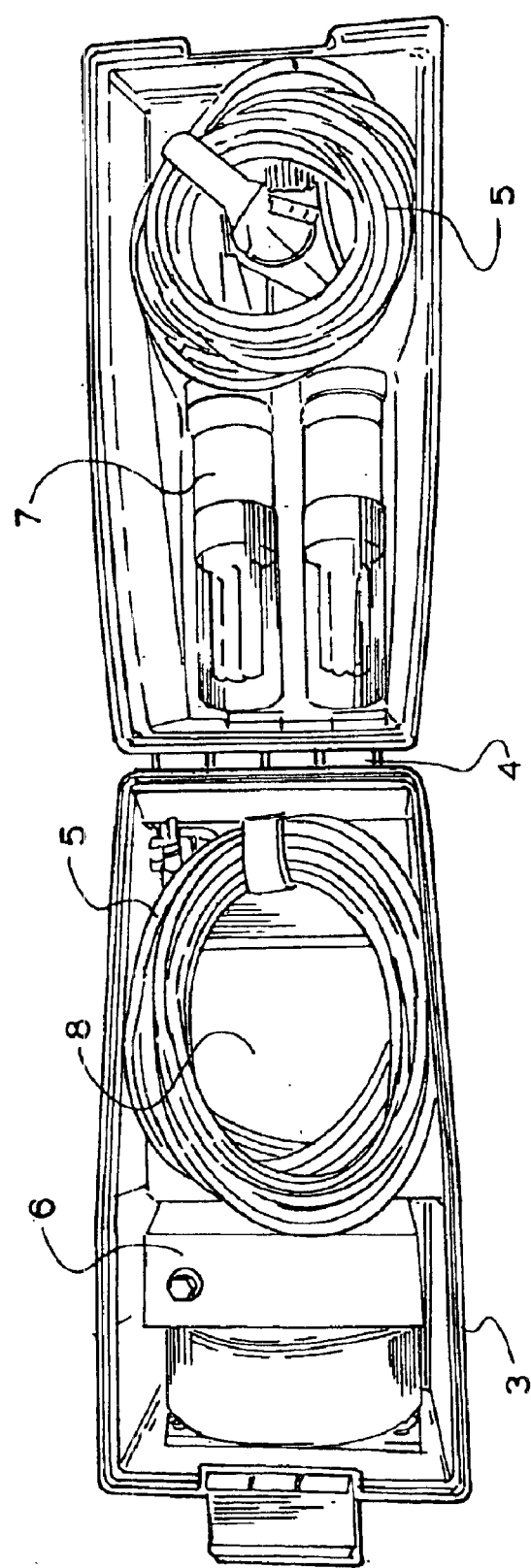
FIG. 2 is a top view showing the housing in open position containing the components of the portable power converter.

A suitable housing is selected which is compact, easy to carry and which can accommodate the various components. FIG. 1 shows a side, perspective view of one particular housing. The housing 1 comprising a handle 2 for ready transportation by hand. Conveniently, the housing comprises a demountable portion such as a hingedly demountable lid 3 which opens in a 180° arc by hinges 4. The two engageable halves of the housing may be injection moulded out of any suitable material such as polyvinylchloride or polyethylene. FIG. 2 shows the housing in open format with hinges 4 and lid 3 clearly visible. Conveniently, a second compartment 8 of the housing contains electrical input and output leads 5, a first compartment 6 adapted to contain the voltage converter means in the form of a step-up transformer and one or more electrical discharge lamps 7. Other accessories may also be included such as connector means (e.g. alligator clips, cigarette lighter plug, etc.) for a 12 volt power source as well as spare lamps and fuses. In an alternative embodiment, some or all of these components may be located on the outside of the box. Preferably, all electrical fittings are in a form in which they are protected from wet and damp conditions.

Figure 3:
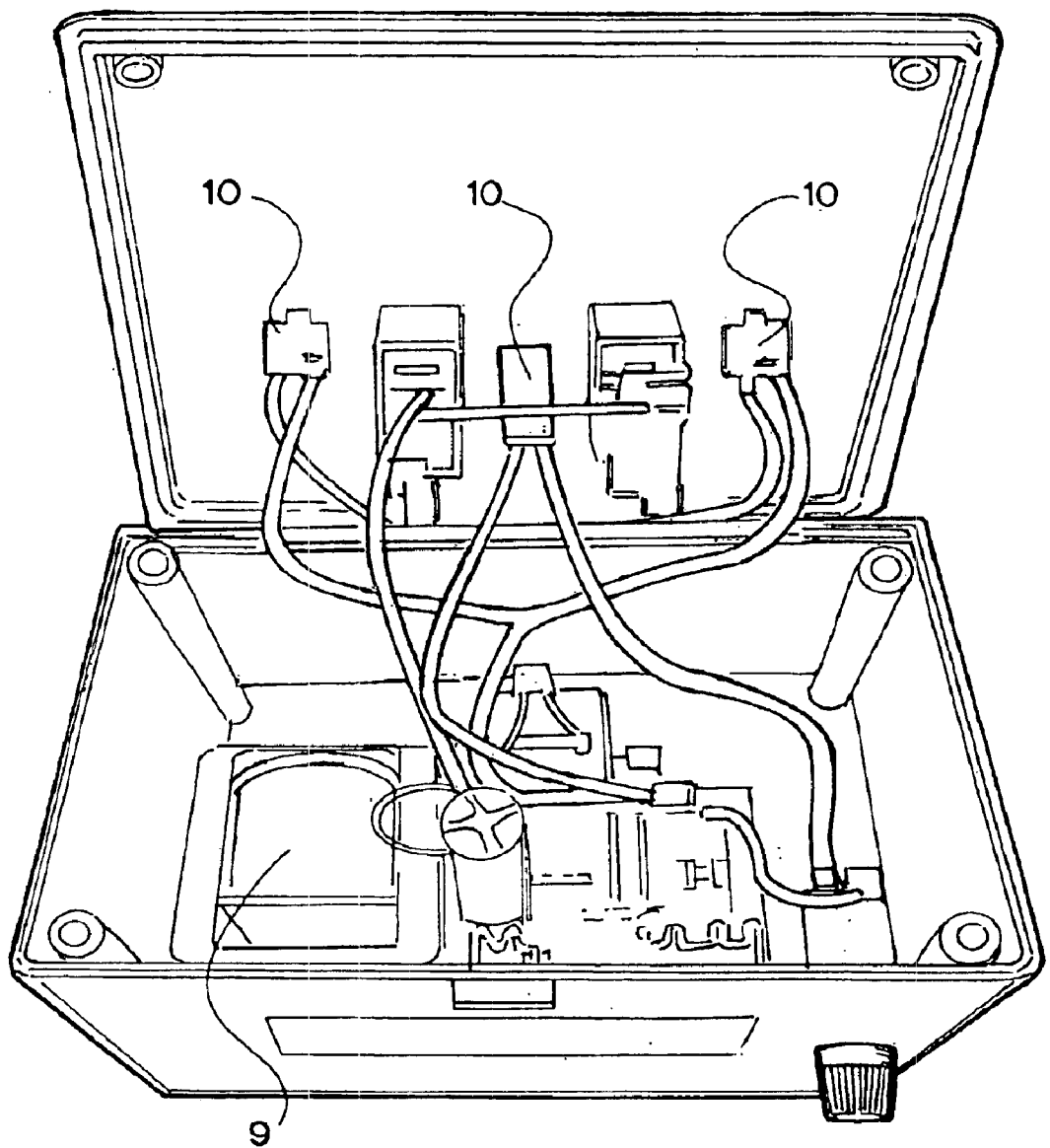
FIG. 3 is a perspective view of the container adapted to contain the step-up transformer and electrical input and output means.

A circuit-containing container (FIG. 3) comprises the voltage converter means in the form of a step-up transformer 9 and voltage input and output means 10.

Figure 4:
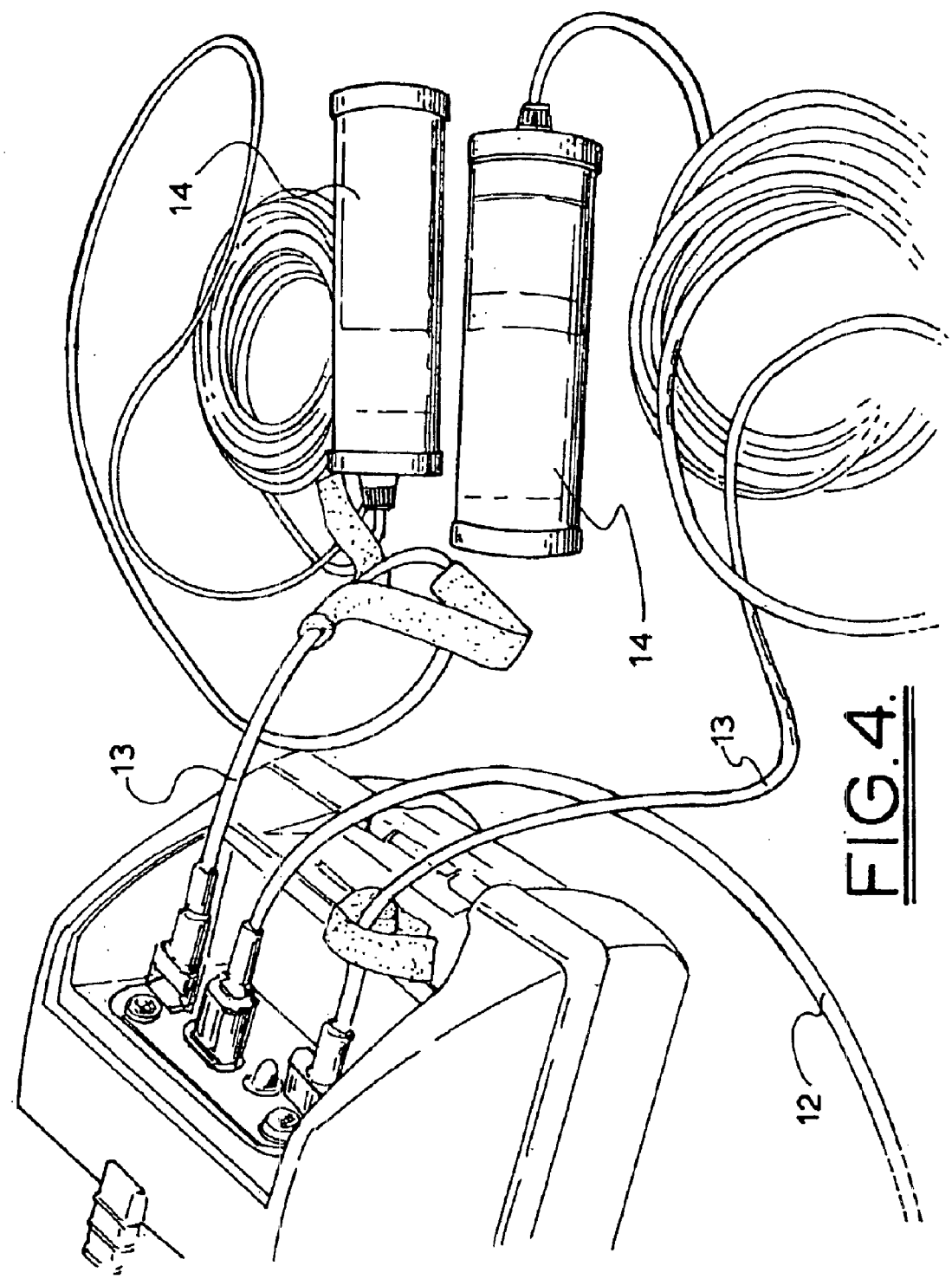
FIG. 4 is a representation of the portable power converter in operation running two composite fluorescent lamps.

In construction, the circuit-containing container is positioned such that the voltage input and output means 9 is outwardly orientated relative to the box such that it is readily accessible without requiring opening of the box. However, the input and output means may be protected by a plastic barrier or cover 11 shown in FIG. 1. In operation (FIG. 4), the 12 volt DC input lead 12 is connected to a 12 volt DC power supply such as via alligator clips or a cigarette lighter plug or other convenient means. One or more output leads 13 are electrically connected to the lamp 14. Preferably, the lamps are connected via an ES socket and most preferably within a ceramic or plastic mould. The lamps may also be protected by a transparent shield.

Figure 5:
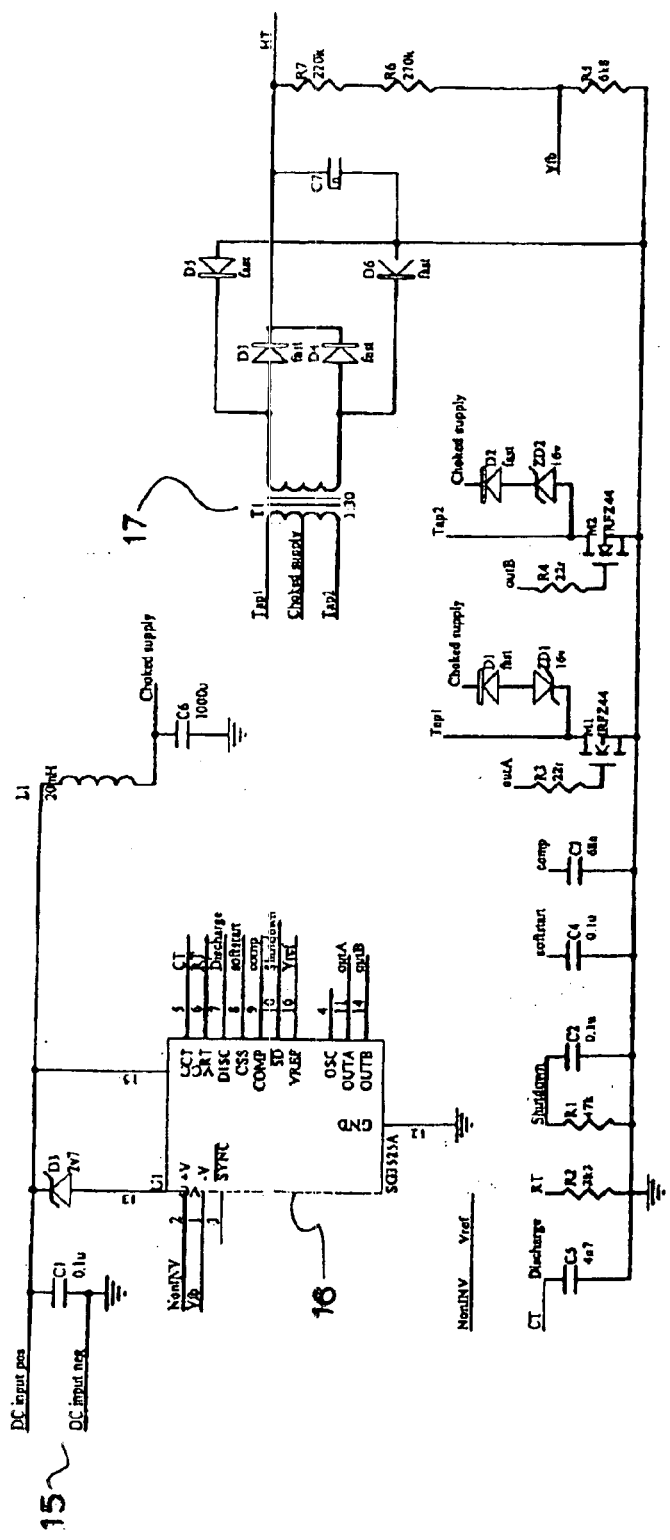
FIG. 5 is a diagrammatical representation of the step-up transformer circuit used in the portable power converter.

The preferred circuit, a step-up transformer circuit is shown in FIG. 5. DC input 15 is provided from a power source to integrated circuit 16 which in turn controls feed of power to step up transfer 17. Transformer 17 produces high voltage DC power for delivery through an electrical conductor to a terminal appliance or appliances.

Figure 6:
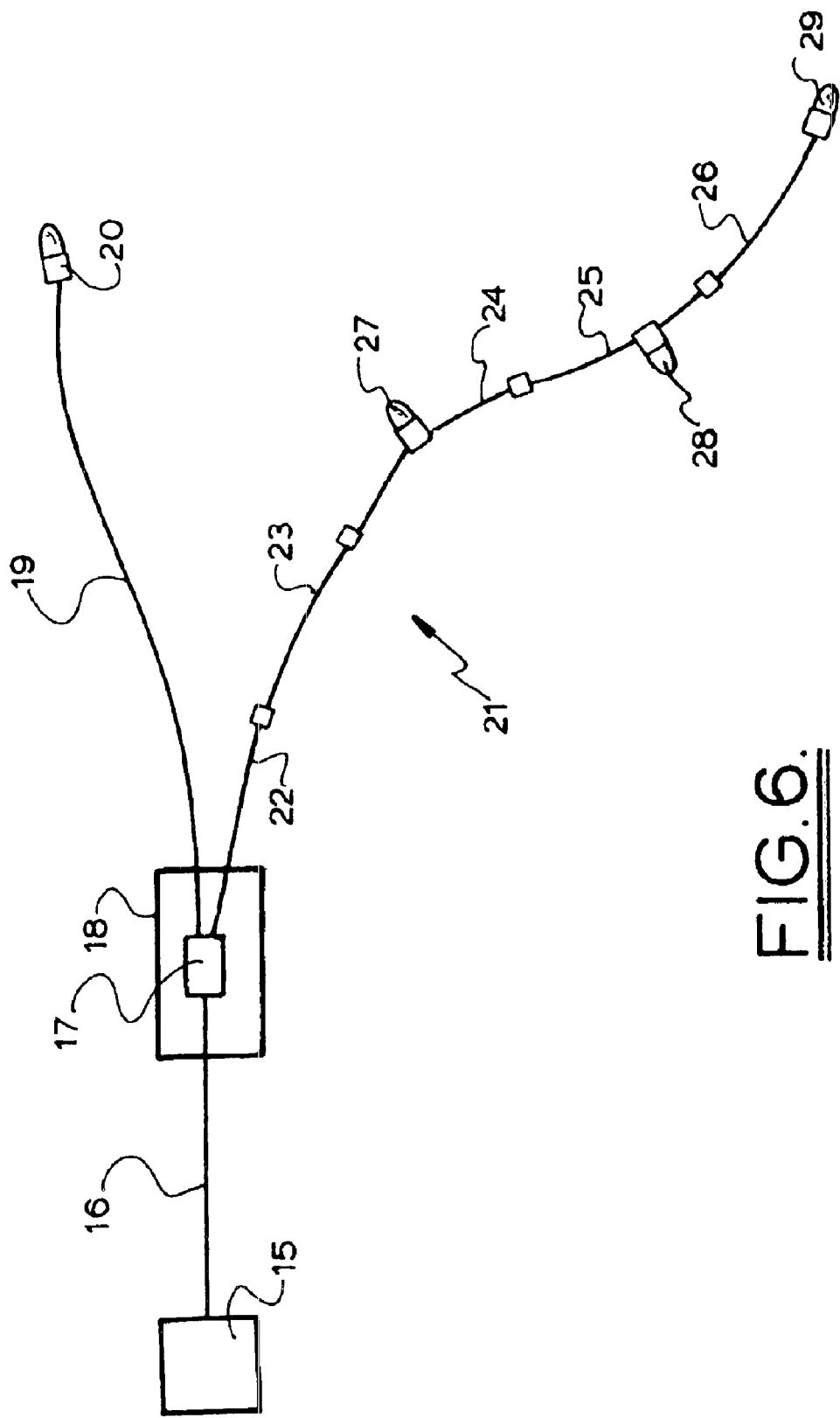
FIG. 6 is a schematic representation of the portable power converter in use.

In FIG. 6, an independent power source 15 such as a 12V battery or power pack is connected to an input lead 16. This connection may be effected with alligator clips, adjustable ring clamps or any suitable method known to a skilled addressee. The input lead 16 is in turn connected to a low DC to high DC voltage power converter 17 situated in a compartment of housing 18. The housing may have two or more compartments. One of the compartments may be formed by the walls of a container for the power converter where the container is fixed to a wall of the housing.

First output lead 19 provides an electrical connection between the converter 17 and an appliance in the form of an electrical discharge lamp 20.

Output lead 21 is formed by a plurality of extension leads 22, 23, 24, 25, 26 each of which are interconnectable with the others. The output lead 21 provides power to multiple discharge lamps 27, 28, 29. The appliances may be connected to the output lead by a switching connector (not shown) comprising an input socket, two switch controlled output sockets to receive appliances or a further extension lead and a throughput line and socket. The throughput line and socket provides an uninterrupted power supplier to an ongoing extension lead while the switched sockets allow a branching configuration of leads or appliances.

Figure 7:
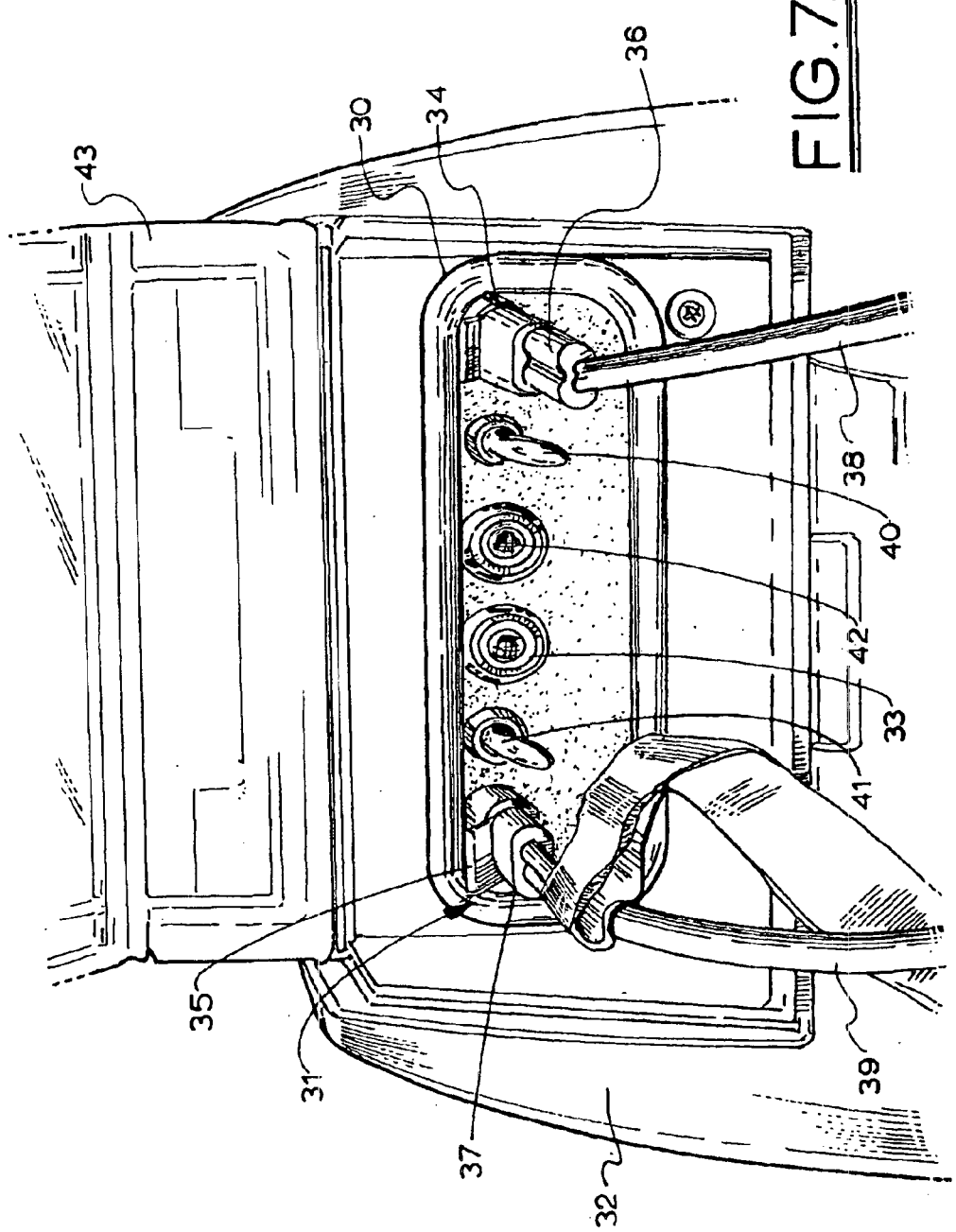
FIG. 7 is front view of a connection panel of the portable power converter.

Referring to FIG. 7 there is seen a connection panel 30 located in an external recess 31 of the housing 32. The connection panel 30 supports an inlet socket 33 for receiving an inlet lead (not shown). The inlet socket 33 is in electrical connection with a power converter (not shown) located in the housing 32.

Two outlet sockets 34, 35 are also shown with outlet plugs 36, 37 positioned in releasable engagement with the sockets 34, 35 respectively. The outlet plugs 36, 37 are in turn permanently connected to outlet leads 38, 39 respectively.

Control switches 40, 41 are present and for controlling power supply to each of the leads 38, 39 respectively. The switches 40, 41 are reversibly moveable between a first position in which a circuit into their respective leads is closed and power is delivered to an appliance and a second open position where the circuit is interrupted. These switches therefore give individual control of the output leads.

An indication light 42 is also present to indicate when either or both switches are switched to an "on" position.

The recess 31 also has a protective barrier 43 which is hinged to the housing 32 and which may be opened to allow access to the panel 30. When not in use the barrier 43 may be flipped closed to protect the connection panel 30 from the external environment.

Figure 8:
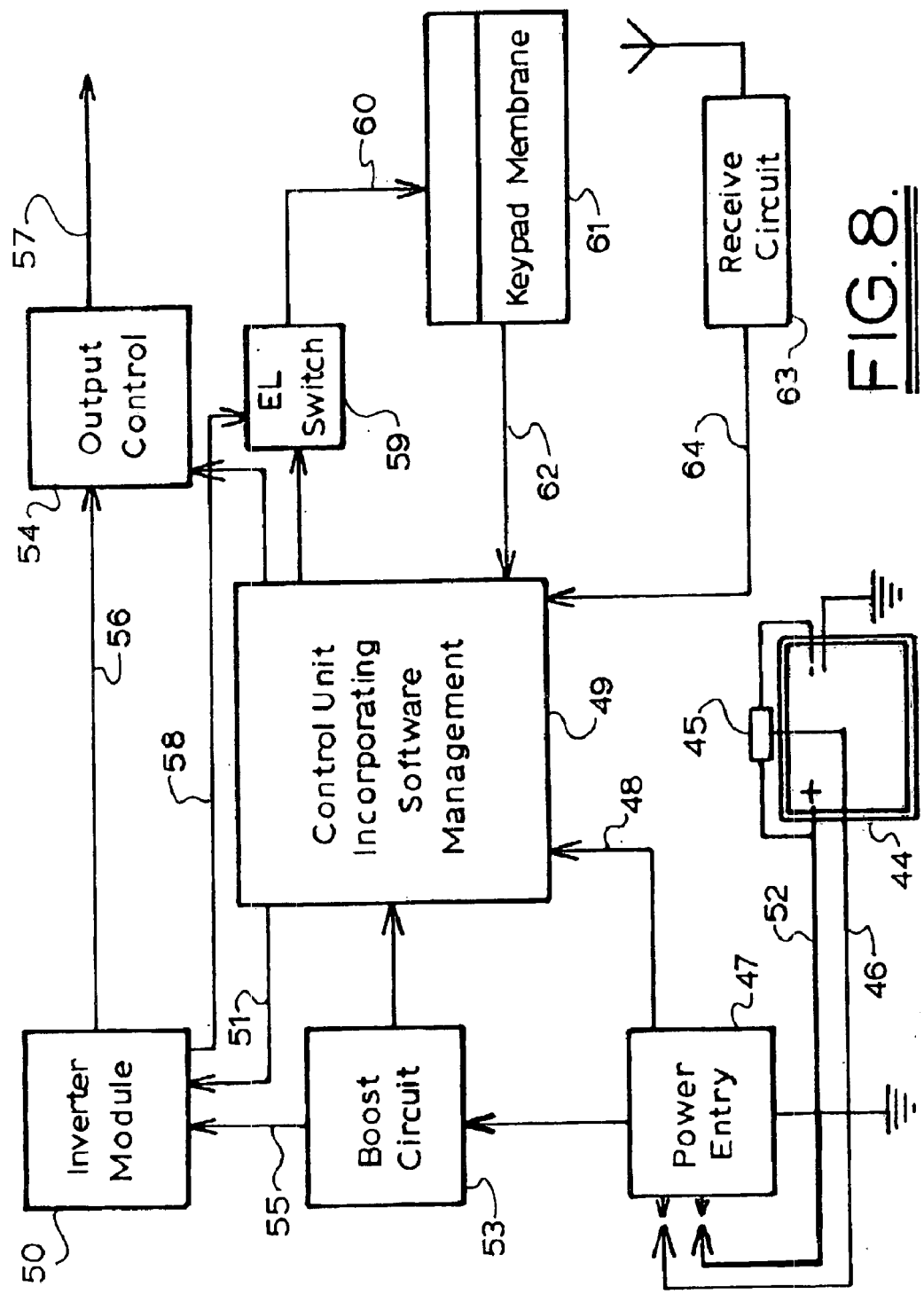
FIG. 8 is a schematic representation of a second embodiment of the portable power converter.

FIG. 8 discloses a schematic representation of a portable power converter including microprocessor control of some functions. Power supply originates from battery 44. While a separate battery is shown it is clear that any appropriate source of suitable voltage may be used. The battery may be installed in a car, tractor or boat. In another embodiment, the power may originate from mains voltage AC power filtered through a step down transformer and inverter to produce DC power.

The battery 44 is connected to monitoring means in the form of a monitor 45 which reads the voltage or potential at the battery terminals. In a preferred embodiment, the monitor also reviews the ambient temperature and temperature of the battery. The monitor may check any suitable indicia such as specific gravity of the fluid in wet cell batteries or electrolyte concentration. Information from the monitor 45 is relayed to the portable power converter through a first data line 46 to an entry point or socket 47, through a second data line 48 and ultimately to a microprocessor 49. The microprocessor 49 may be programmed to analyse information from the monitor 45. If the available power falls below a pre-selected threshold, the microprocessor 49 may send a signal to a step-up converter 50 through a third data line 51 to shut the system down and thereby avoid damage to the battery 44.

The microprocessor may be programmed according to the following algorithm.

If:

$V_{m>V_t}$ all appliances powered where $V_m$=monitored voltage $V_t$=a threshold voltage at which adequate power will be available in the system to power all appliances.

If:

$V_{m<V_c}$ the system is shut down where $V_m$=monitored voltage $V_c$=is a critical voltage below which there is the possibility of damage to the power source or any component of the system.

If:

$V_m>V_c$ and $V_m<V_t$ then the number of appliances shut down (N) is determined as follows:

$$N = \frac{\Delta V}{V_R} \text{ raised to the next highest whole number.}$$

where $\Delta V=V_t-V_m$ and $V_R$=required voltage per appliance where individual appliances have different power requirements, it may be that N=the number of appliances with voltage requirements of $V_{R_1}$, $V_{R_2}$, $V_{R_3}$, etc. which added together equal or exceed $\Delta V$.

Power from the battery 44 is delivered by input lead 52 to a power entry point 47 which may include a plug and socket connection for connecting the lead 52 to the rest of the components of the portable power converter.

Power is then fed to a boost circuit 53 which ensures the maintenance of a relatively steady voltage supply to the step-up converter 50. For example a 12V battery may produce 12.6V of potential across the terminals of the battery 44. By the time power reaches the boost circuit 53, that voltage may have dropped to 11.6V. The boost circuit 53 may be used to return the voltage to its original level or to increase the voltage to another desired level.

Preferably, the boost circuit, is in signal connection with the microprocessor 49 enabling the latter to monitor the arrival and departure voltages of the boost circuit. The microprocessor 49 may be programmed to maintain the voltage from the boost between certain pre-defined limits. If the voltage falls below a critical level, the system may be shut down. The microprocessor may have control of a switch in the boost circuit to provide a further shut down capacity. This feature may further broaden the application of the invention as 12 volt powered devices may be powered from a take-off between the boost circuit 53 and converter module 50. Therefore the system may power both 12 volt devices as well as devices requiring high voltage. The system may therefore protect both the power source, end appliances and components of the invention while powering appliances with different voltage requirements.

Power is delivered through first internal lead 55 to the converter module 50 which produces high voltage DC power. The voltage is preferably around the range of 320 V to 360V. Power is fed along second internal lead 56 to an output control 54.

The outlet control 54 includes a switch which provides a gate control to the provision of power to electrical output lead 57. Typically the device will include two outlet sockets with a switch for each.

The converter module 50 also provides power through first keypad lead 58 to a soft panel switch 59 which when activated delivers power to second keypad lead 60. Power is then provided to keypad 61 which may include electroluminescent backlighting to enhance visibility.

The keypad 61 is in signal communication with the microprocessor 49 via data line 62 and permits a user to enter data and instructions. For example, the system may be programmed to automatically close down after a set time, thereby allowing a camper to retire without needing to turn lighting off first. The system may be programmed to start at a particular time of day. Both the last two functions require time keeping means which may be in the form of an internal clock (not shown) within the microprocessor. Pre-selected acceptable voltage ranges for the battery may be entered or amended so that information from the monitor 45 can be applied as required. This also allows setting of the shut down voltage at which the converter 50 will be deactivated to protect components of the portable power converter when a minimum required voltage is reached.

In a further embodiment, the portable power converter may include an internal back-up power source, such as a 12 volt battery, to provide limited emergency powering of the system. In this case, the microprocessor may be programmed to switch to the internal battery if the external power source falls too low or rises too high. Such a case may arise when a system is powered from a vehicle battery and the vehicle is started. On detecting a major voltage variation at the battery monitor 45, the microprocessor may switch to the internal battery (not shown) until the original source power stabilises before switching back. Preferably, the system also includes an automatic recharging capacity for the internal battery which is powered by the external power source such as the battery 45. This process may be facilitated by the boost circuit. This addition provides the distinct advantage of uninterrupted and steady power flow in the portable system.

Figure 9:
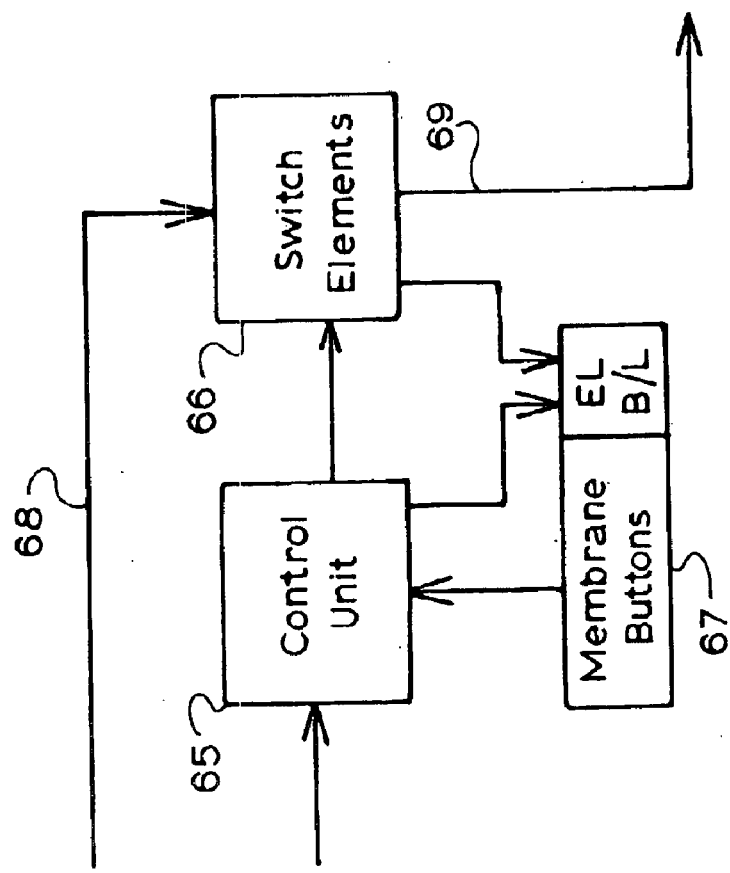
FIG. 9 is a schematic representation of additional optional elements for the embodiment of FIG. 8.

The portable power converter may also include a transmission receiving unit 63 for use with a remote wireless control. The unit 63 is in signal connection with the microprocessor 49 via data line 64.

Where more than two output leads or more than two appliances are used, the componentry of FIG. 9 may be advantageously applied.

A secondary control is provided which may be in the form of a switch pack comprising secondary control unit 65 and switch 66. Each switch pack has an individual electronic identifier which is identifiable by the microprocessor 49. On introduction of a new switch pack to the system it is "interrogated" by the microprocessor and its position or address in the chain is established. A priority may be assigned to each particular switch pack so that in the event of power decrease, the microprocessor 49 may selectively instruct the switch packs to shut down in a pre-determined prioritised way until either the power supply stabilises or the whole system shuts down.

In yet a further embodiment, the secondary control unit 65 may be in signal connection with a control keypad 67 to provide local input of instructions. The control keypad 67 may include electro-luminescent back lighting.

In this circumstance, instructions introduced through the local keypad 67 may override microprocessor 49 in its local effect and allow local prioritising of function. The secondary control unit 65 may activate the switch 66 to provide or interrupt power supply. The secondary control unit 65 may include processing capacity to provide an ability to monitor pre-selected indicia such as voltage at the switch pack and institute preferred automatic action such as interrupting the circuit if local power supply falls below a set threshold. The components may function so power from the housing cannot be interrupted when the local keypad is activated.

The switch 66 receives power from output lead 68 which may be continuous with output lead 57 of FIG. 8. When closed, switch 66 provides power to secondary output lead 69 which in a preferred form comprises two separate leads. This arrangement allows a branching configuration for the system with individual control of each sub-branch or in certain circumstances, of each extension lead section.

The output lead 68 may include a data conducting line to allow signal communication through the output control 54 and back to the microprocessor 49. In this case, the microprocessor 49 may have default control of the switch 66 until secondary control unit 65 is activated. The secondary control unit 65 may be programmable to duplicate at least some of the activities of the microprocessor 49.

The switch pack comprising the secondary control unit 65, switch 66 and control keypad 67 may be located adjacent to or in connection with an appliance, to provide individual control of that appliance. In the case of a light the switch pack may be disposed in a moulded base piece and handle supporting a light bulb.

The switch pack may be powered by its own internal battery, which is preferably a rechargeable battery. Alternatively or additionally the switch pack may be powered by a pulsed power signal delivered by signal or communication lines.

In use, the switch pack may first be plugged into a recharged socket which may be provided on the housing, in electrical connection with the battery 44, where a charge indicator will show the current state of charge. The switch pack may be recharged and checked for identification and an address in the priority layout either identified or assigned. The switch pack is then ready for use in the system.

The presence of individual control on lines or appliances provides the capacity for a user to programme and vary appliance power configurations. Certain appliances may be chosen to be activated with different periods of activity programmed for one or more of these appliances and with subsequent activation of still other appliances.

Figure 10:
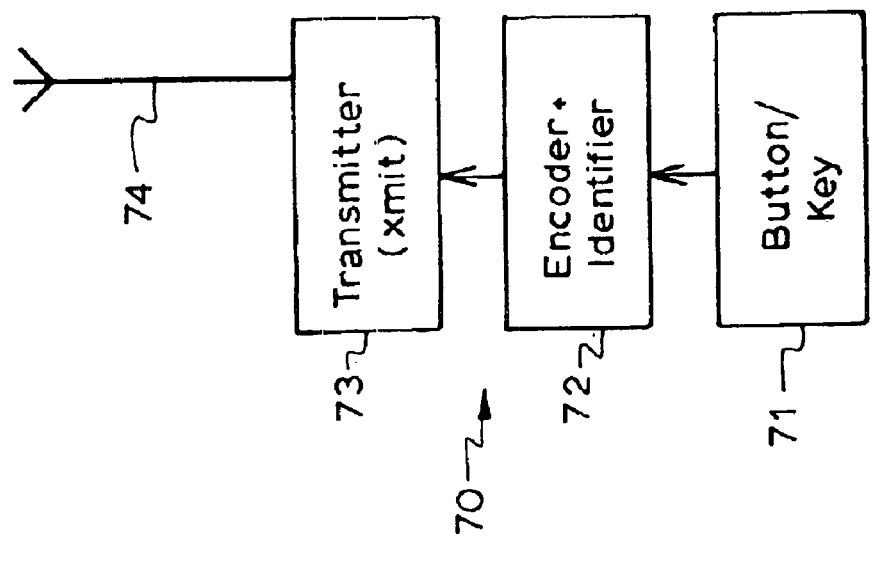
FIG. 10 is a schematic representation of a remote control for the portable power converter.

Referring to FIG. 10, there is shown a schematic representation of a remote control 70 in wireless communications with receiving unit 63. A control button 71 provides signal input means and a variety of functions may be initiable from the control. For example, a certain number of button depressions may turn the system on or off. A second button may be provided to initiate a programming capacity allowing features such as delayed turn off to be set or instigated. Other programmable functions of the microprocessor may be controllable by the control button 71.

The remote control 70 also includes an electronic individual encoder and identifier 72 which is read by the microprocessor 49 before responding to input from the remote control 70. This avoids overlap of user control units with subsequent confusion and nuisance activation of systems. The remote control 70 also includes a transmitter unit 73 with aerial 74.

Figure 11:
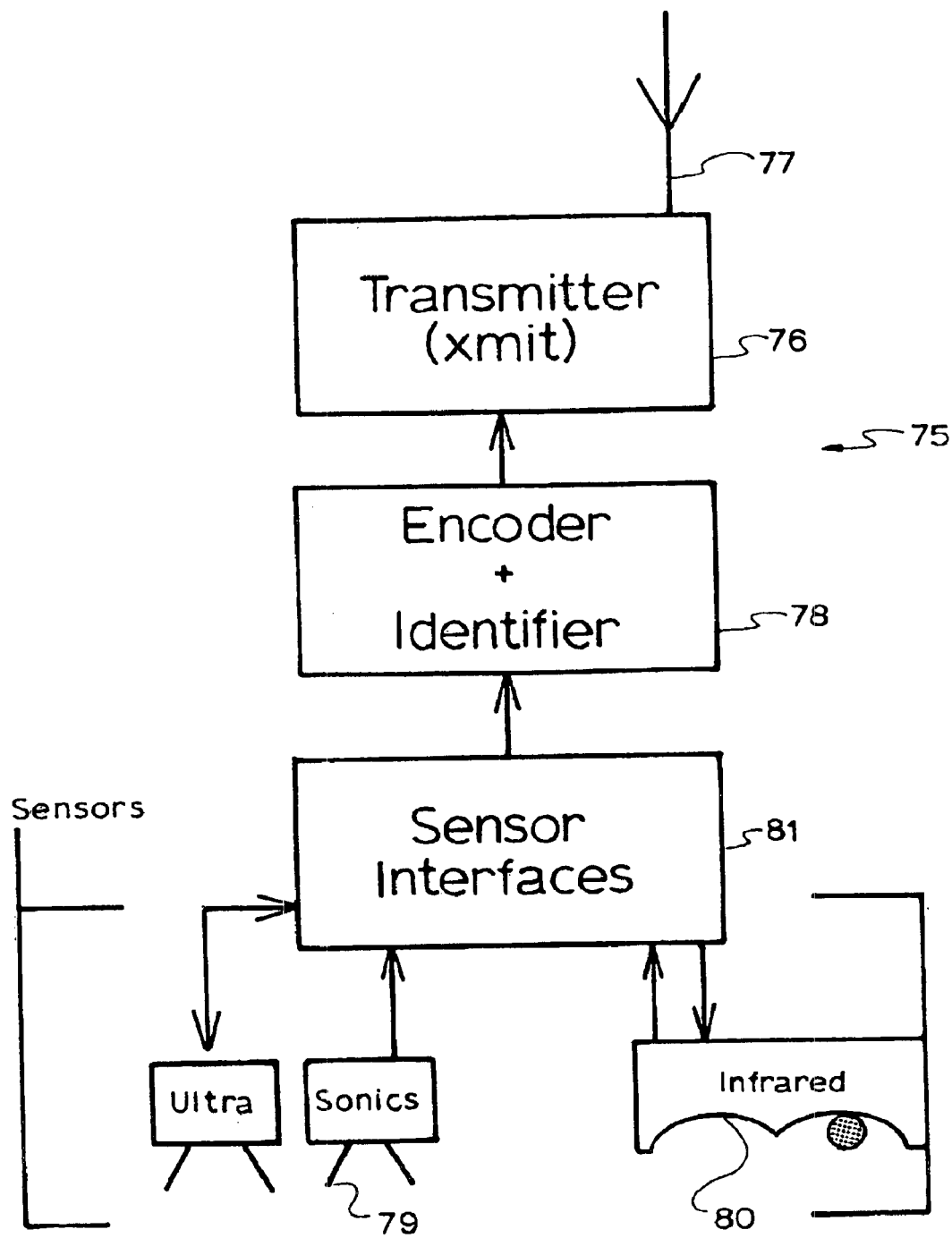
FIG. 11 is a schematic representation of an automatic remote activator for the portable power converter.

FIG. 11 discloses an automatically activated remote control 75 which includes a transmitter unit 76 and aerial 77 as well as an individual encoder and identifier 78.

However, in this embodiment, the remote control 75 is activated by sensors such as ultra sound detectors 79 or infra-red detectors 80 which feed into sensor/control interface 81. On activation of the sensors 79, 80 alone or in combination, the remote control 75 may activate a lighting system or any other suitable response, such as activate an alarm or a camera. This variation on the invention provides a mobile self-contained portable alarm on security system. This is of great importance to campers in areas where dangerous animals roam. It may also be of great value in areas of armed conflict. Further, the utility of a portable, cheap power system which can be easily rigged to provide a remotely triggered security system is clearly of great value. While security has been emphasised, it is obvious that many uses can be found for the system. For example, a portable lighting system may be activated automatically by a pedestrian at night to ensure the safety of his or her approach to a camp site.

The individual remote control sensor may be identified by the microprocessor so that appliances are selectively activated in response to sensor activation. For example, lights in a certain area may be turned on in response to a signal from a specific remote control, while other lights connected to the system are left inactivated.

The housing of the present invention is preferably adapted to store all the above components internally. The microprocessor may be permanently located within the housing while other components deployed externally in use may be stowed in the housing when not in use. This provides a self-contained portable power converter with sophisticated programmable and protective functions in one easily accessible container.

In summary the microprocessor may be programmed to control functions including:

high voltage switching;

electro-luminescent lamp activity and;

inverter shut down in low power situations;

power requirement monitor for the inverter;

checking the lamp number to power ratio;

analysis of serial data from remote devices;

receiving input from the keypad at the user interface;

monitoring and controlling the boost circuit; and sequence interpretation for power down and safe power up automation.

The microprocessor may also monitor or receive data to monitor various indicia including:

voltage at the battery temperature at the battery voltage before boosting variable proportional boost output sensing remote temperature monitoring for appliances such as refrigerators and chillers;

level of available power monitoring with automatic response if values stray outside a set range of values.

When the appliance is a light or lights, the light units may have a moulded housing for receiving a bulb and that housing may incorporate a membrane switch for on and off activity, an identification chip to specifically identify the appliance and an address element for locating the unit in the overall distribution of appliances with the address element connected to a switch element for the housing thereby providing individual control of each appliance.

In addition, the system may include a level alarm program in the microprocessor with settings such that the device will not turn on below a certain critical point of power availability. If the system is below that critical point, appliances will be switched off and the system shut down at the power converter. After a preset time which may be varied by an operator, the system may be programmed to automatically conduct a brief check of power availability. If the critical point is exceeded, the system may be reactivated. Alternatively, if the critical point of power is still not available the system will close down again for the preset period before checking again. This cycle may be repeated throughout the close down period of the system.

If the system is providing power to a device such as a refrigerator, the microprocessor may be programmed automatically to shut down during a period of peak insulating efficiency. For example, the appliance may be shut down during the period from midnight to 6:00 am. This ability arises from the system's capacity to individually identify a single appliance when multiple appliances are in use. The ability to selectively power or depower appliances independently of any other appliance provides great scope for energy efficiency and utility of the system.

Any number of modifications may be made to the portable power converter such as but not limited to multiple output means and electrical means to prevent draining of power from a 12 volt power supply. This is important with respect to saving energy in a car or boat.

Of the many advantages of the present invention, a major advantage is that the portable power source can operate electrical discharge lamps with high efficiency. More particularly, the portable voltage converter may operate composite fluorescent lamps from approximately about 5 watt to 30 watt.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

What is claimed is:

1. A portable power converter comprising an input device to receive a low voltage DC input, a voltage converter to convert said low voltage DC input into a high DC voltage output, said voltage converter in electrical communication with the input device, an output device adapted to operably supply said high DC voltage to two or more appliances, said output device in electrical communication with the converter, and a housing adapted to receive at least one of the input device, the voltage converter and the output device, wherein the input device includes at least one input electrical conducting lead, the voltage converter includes a DC step-up transformer and the output device includes at least one output electrical conducting lead, wherein the low DC voltage input is in the range of from about 5 volts to about 50 volts, and wherein the high DC voltage output is in the range from about 200 volts to about 600 volts.

2. The portable power converter of claim 1, wherein the at least one electrical output lead is at least about 100 meters in length.

3. The portable power converter of claim 2 wherein the at least one electrical output lead is at least about 200 meters in length.

4. The portable power converter of claim 3 wherein the at least one electrical output lead is at least about 500 meters in length.

5. The portable power converter of claim 1 wherein the housing includes a first internal compartment adapted to receive the voltage converter and a second internal compartment adapted to store the input device and the output device when not in use.

6. The portable power converter of claim 5 wherein the second compartment is further adapted to receive the two or more appliances when not in use.

7. The portable power converter of claim 1 wherein the housing is formed from two engageable components movable between a closed position and an open position.

8. The portable power converter of claim 7 wherein the two components are molded and are hingedly connected to allow rotation of the components relative to each other between the closed position and the open position.

9. The portable power converter of claim 1, wherein the at least one electrical output lead comprises a plurality of interconnectable leads.

10. The portable power converter of claim 9 wherein each lead is about 10 meters in length.

11. The portable power converter of claim 1, further comprising two or more appliances.

12. The portable power converter of claim 11 wherein the two or more appliances comprise at least one electrical discharge lamp.

13. The portable power converter of claim 12 wherein the at least one electrical discharge lamp comprises a compact fluorescent lamp.

14. The portable power converter of claim 13 wherein the compact fluorescent lamp is held by a ceramic plastic fining engageable with at least one of an end of the output lead remote from the power converter or intermediate said end and the power converter means.

15. The portable power converter of claim 13 wherein the compact fluorescent lamp is protected by a transparent shield.

16. The portable power converter of claim 1 wherein the housing further comprises attachment for fixing the housing to a surface.

17. The portable power converter of claim 16 wherein the attachment comprises at least one aperture to receive a fixing member.

18. The portable power converter of claim 16 wherein the attachment comprises a clamp engageable with the housing, said clamp including at least one aperture to receive a fixing member.

19. The portable power converter of claim 1 further comprising an inlet socket device located between the input device and the converter, and an outlet socket device located between the converter and the output device to removably engage the input device and output device respectively.

20. The portable power converter of claim 19 further comprising a switch device to control the delivery of power to the output device, the switch device movable between a first position in which an electrical circuit for distribution of power to the output device is open and a second position wherein the electric circuit is closed.

21. The portable power converter of claim 20 wherein the switch device includes a toggle switch.

22. The portable power converter of claim 20 wherein the input socket device, the output socket device and the switch device are located in an external recess of the housing.

23. The portable power converter of claim 22 wherein the external recess includes a protective barrier movable between a first position wherein access to the input socket device, the output socket device and the switch device is provided and a second position wherein the recess is protected from an external environment.

24. The portable power converter of claim 1 wherein the housing is waterproof.

25. The portable power converter of claim 1 further comprising a processing device.

26. The portable power converter of claim 25 wherein the processing device is a microprocessor.

27. The portable power converter of claim 26 where the microprocessor is programmed to perform at least one of control high voltage switching, control electro-luminescent lamp activity, control voltage converter shut down, receive data input from remote devices, respond to input by a user through a keyboard, monitor boost circuit voltages, control power up and power down sequences and shut down the system at the boost circuit level.

28. The portable power converter of claim 25 further comprising a power monitor engageable with the output terminals of a power source and in signal communication with the processing device.

29. The portable power converter of claim 25 further comprising a boost circuit device to boost DC voltage prior to delivery to the converter, said boost circuit device in electrical communication with the converter and the power source and located intermediate the converter and the power source.

30. The portable power converter of claim 29 wherein the boost circuit device is in signal communication with the processing device and subject to control by the processing device.

31. The portable power converter of claim 30 wherein the boost circuit device further comprises a circuit switching device to open or close a circuit to the voltage converter, said circuit switch device moveable between an on and off position in response to signal communication from said processing device.

32. The portable power converter of claim 25 further comprising a programming device.

33. The portable power converter of claim 32 wherein the programming device is a keyboard in signal communication with the processing device.

34. The portable power converter of claim 33 wherein the keyboard further comprises electro-luminescent backlighting.

35. The portable power converter of claim 25 further comprising a receiving device to receive a transmitted signal, said receiving device in signal communication with the processing device.

36. The portable power converter of claim 25 further comprising a switch pack, said switch pack comprising a secondary control unit and a switch, said secondary control unit in signal communication with the processing device.

37. The portable power converter of claim 36 wherein the switch pack further comprises a keypad control in signal communication with the secondary control unit and providing local control of the secondary control unit.

38. The portable power converter of claim 35 further comprising a remote control device.

39. The portable power converter of claim 38 wherein the remote control is manually activated.

40. The portable power converter of claim 38 wherein the remote control is activated by sensors responsive to environmental stimuli.

41. The portable power converter of claim 40 wherein the environmental stimuli include at least one of sound, movement, light and temperature.

42. A portable power converter comprising:
a weather resistant housing, comprising a handle and two hingedly engaged members movable between a closed position and an open position;
a power converter to convert a low DC voltage to a high DC voltage, the power converter located inside the housing;
an input lead to provide an electrical connection between a power source and the power converter;
an inlet lead to provide an electrical connection between a power source and the power converter;
at least one output lead to provide an electrical connection between the power converter and two or more appliances;
at least one outlet socket to removably receive the at least one output lead;
a switch for the at least one outlet socket, said switch movable between an off position in which an electrical circuit in a respective outlet lead is open and an on position in which the electric circuit is closed; and
two or more compact fluorescent lamps;
wherein the input lead, the at least one output lead and the two or more compact fluorescent lamps are stowable within the housing.

43. The portable power converter of claim 42 wherein the at least one output lead comprises multiple interconnectable extension leads.

44. The portable power converter of claim 42 further comprising a power source locatable within the weather resistant housing.

45. The portable power converter of claim 44 wherein the power source is a battery.

46. A portable power converter comprising an input device to receive a low voltage DC input, a voltage converter to convert said low voltage DC input into a high DC voltage output, said voltage converter in electrical communication with the input device, an output device adapted to operably supply said high DC voltage to two or more appliances, said output device in electrical communication with the converter, and a housing adapted to receive at least one of the input device, the voltage converter and the output device, wherein the low DC voltage input is in the range from about 8 volts to about 24 volts, and wherein the high voltage DC output is in the range from about 300 volts to about 400 volts.

47. The portable power converter of claim 46, wherein the high voltage DC output is in the range from about 320 volts to about 380 volts.

* * * * *

UNITED STATES PATENT AND TRADEMARK OFFICE
CERTIFICATE OF CORRECTION

PATENT NO. : 6,894,439 B2
DATED : May 17, 2005
INVENTOR(S) : Ean Patrick Stewart and Andrew Douglas Burchill It is certified that error appears in the above-identified patent and that said Letters Patent is hereby corrected as shown below:

Column 15,
Line 2, please delete "fining" and insert therefore -- fitting --.

Signed and Sealed this

Eleventh Day of October, 2005

JON W. DUDAS
*Director of the United States Patent and Trademark Office*